(12) United States Patent
Borchardt

(10) Patent No.: US 10,756,434 B1
(45) Date of Patent: Aug. 25, 2020

(54) DE-TUNING TOLERANT LOOP ANTENNA

(71) Applicant: National Technology & Engineering Solutions of Sandia, LLC, Albuquerque, NM (US)

(72) Inventor: John Joseph Borchardt, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 179 days.

(21) Appl. No.: 16/127,577

(22) Filed: Sep. 11, 2018

(51) Int. Cl.
| | |
|---|---|
| *H01Q 7/00* | (2006.01) |
| *G06K 19/07* | (2006.01) |
| *H01Q 1/24* | (2006.01) |
| *H01Q 1/22* | (2006.01) |

(52) U.S. Cl.
CPC ........... *H01Q 7/00* (2013.01); *G06K 19/0723* (2013.01); *H01Q 1/2225* (2013.01); *H01Q 1/243* (2013.01)

(58) Field of Classification Search
CPC .......... H01Q 1/243; H01Q 1/225; H01Q 7/00; G06K 19/0723
USPC ....................................................... 343/870
See application file for complete search history.

(56) References Cited

U.S. PATENT DOCUMENTS

| | | | | |
|---|---|---|---|---|
| 5,714,937 | A | * | 2/1998 | Campana, Jr. ..... G08B 21/0202 340/572.7 |
| 2001/0000959 | A1 | * | 5/2001 | Campana, Jr. ......... H04B 17/23 340/573.1 |
| 2010/0237709 | A1 | * | 9/2010 | Hall ........................ H02J 50/10 307/104 |
| 2013/0293354 | A1 | * | 11/2013 | Vemagiri ........... G06K 19/0723 340/10.1 |
| 2017/0110796 | A1 | * | 4/2017 | Rokhsaz .............. H04B 5/0062 |
| 2018/0123221 | A1 | * | 5/2018 | Finn ....................... H01Q 7/005 |

OTHER PUBLICATIONS

Ng, Mun Leng, et al. "A Small Passive UHF RFID Tag for Metallic Item Identification", 2006, 4 pages.

* cited by examiner

*Primary Examiner* — Huedung X Mancuso
(74) *Attorney, Agent, or Firm* — Madelynne J. Farber; Mark A. Dodd

(57) ABSTRACT

A loop antenna is described herein that is suitable for operation in free space or in proximity to a ground plane. The loop antenna comprises a looped conductive element with a gap formed therein and a tab extending toward the gap. A length of the tab of the loop antenna is selected such that a detuning loss of the loop antenna from operation in free space to operation in proximity to a ground plane is low. In an exemplary embodiment, the length of the tab is selected such that a reactance of the loop antenna in free space is within a threshold level of a reactance of the loop antenna when the antenna is in proximity to a ground plane.

19 Claims, 8 Drawing Sheets

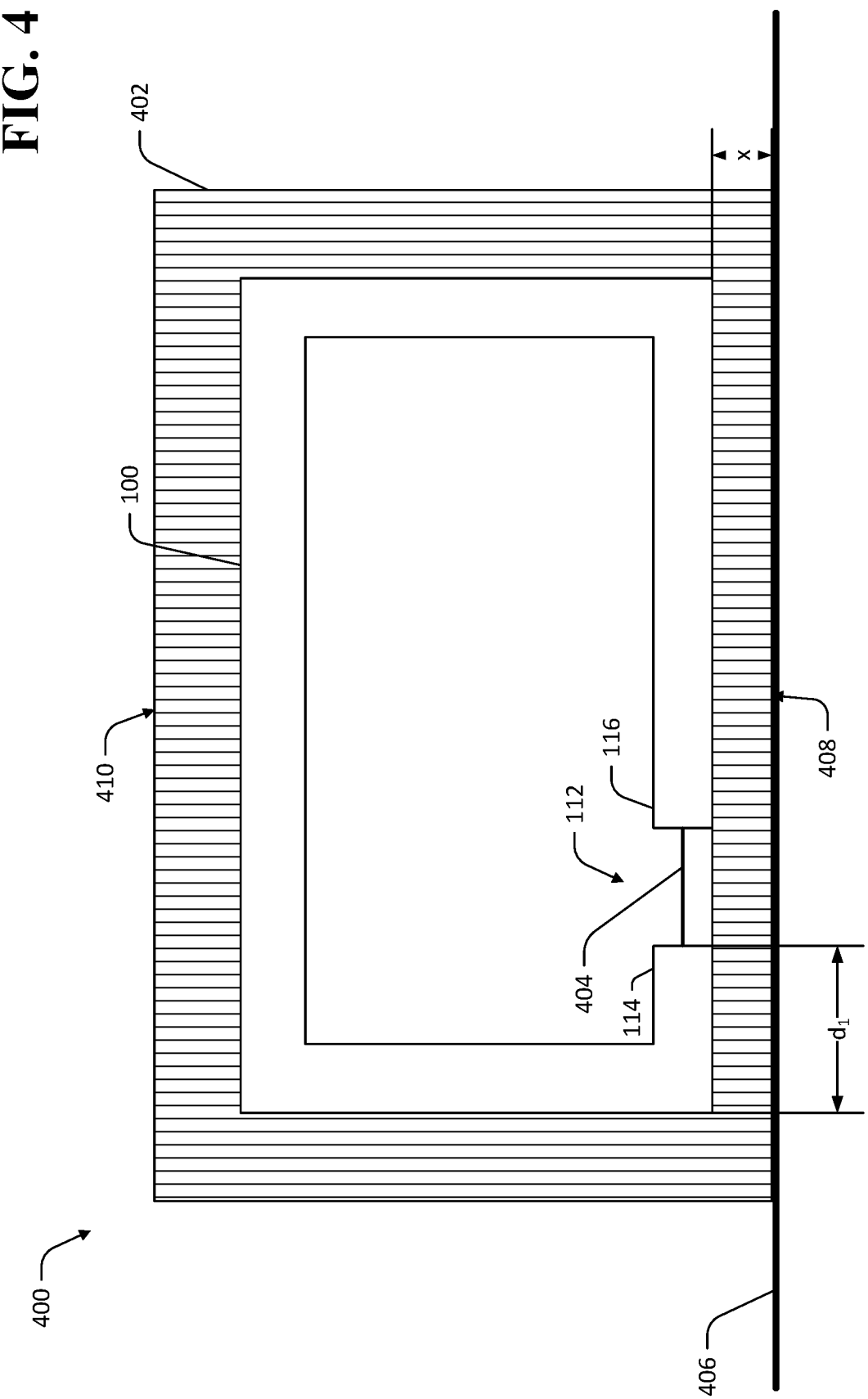

DE-TUNING TOLERANT LOOP ANTENNA

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Antennas are commonly employed in devices such as radio frequency identification (RFID) tags and mobile telephones that are deployed in a range of environments. Antennas generally exhibit different characteristics in free space than when in proximity to a conductive ground plane (e.g., a metal surface). For instance, the power delivered to a conventional antenna given constant power available at a feed of the antenna may be significantly less when the antenna is in proximity to a ground plane as compared to when the antenna is in free space, or vice versa. Conventionally, antennas have been constructed so as to be tuned to function either in free-space environments or environments in proximity to ground planes, not both. While a conventional antenna can be operated both in free space and near ground planes, generally such an antenna will exhibit significant loss in one environment or the other, potentially rendering the conventional antenna unusable for its intended purpose in one environment or the other.

SUMMARY

The following is a brief summary of subject matter that is described in greater detail herein. This summary is not intended to be limiting as to the scope of the claims.

A detuning-tolerant loop antenna is described herein that is suitable for use in free space and in proximity to a ground plane. It has been determined that detuning of an antenna in proximity to a ground plane (e.g., such that the antenna is less efficient at the operating frequency when operated in proximity to the ground plane than when operated in free space) is due at least in part to resonant frequency shift resulting from the antenna mirror effect. For example, and referring now briefly to FIG. 7A, a diagram 700 of simulation results of voltage reflection coefficient versus frequency for a conventional loop antenna operating in free space and in proximity to a ground plane is illustrated. In FIG. 7A, the operational frequency of the conventional antenna (e.g., a frequency for which the antenna is tuned, or a frequency at which the antenna is desirably operated) is normalized to zero, and the voltage reflection coefficient at the operational frequency is very small for the conventional loop antenna in free space, allowing for efficient operation in free space. By contrast, at the operational frequency, the voltage reflection coefficient for the conventional loop antenna when located on the ground plane is much larger in magnitude than when the antenna is located in free space, yielding a lower efficiency of the conventional loop antenna on the ground plane. The simulation results depicted in FIG. 7A further indicate that when the conventional antenna that is designed for operation in free space is operated on a ground plane, the voltage reflection coefficient is at a minimum and thus maximum power is delivered at a frequency that is approximately 1% less than the operational frequency of the antenna in free space.

The resonant frequency shift can be modeled as resulting from a change in antenna reactance in the ground plane environment relative to the reactance in the free space environment. The change in reactance can be modeled as resulting from mutual inductance linkage between the antenna and a mirrored virtual image of the antenna reflected through the ground plane. Loop antennas described herein are constructed such that at the desired operating frequency when the antenna is placed in proximity to a ground plane the reactive part of the impedance looking into the terminals of the antenna feed is substantially the same as the reactive part of the impedance looking into the terminals of the antenna feed when the antenna is in free space (e.g., such that the reactances are within 10%, within 5%, or within 1% of one another). For instance, and referring now briefly to FIG. 7B, a diagram 702 depicts simulation results of reactance versus frequency for a loop antenna 100 depicted in FIG. 1. The diagram 702 indicates that the reactance of the antenna 100 in free space and on a ground plane is approximately equal at the operational frequency (normalized to zero).

In an exemplary embodiment, a loop antenna comprises a looped conductive element having a gap formed therein. In various embodiments, the looped conductive element is a rectangular loop, a triangle loop, a circular loop, or other suitable looped element. A conductive tab extends toward the gap formed in the looped element. In an exemplary embodiment, a length of the conductive tab is selected such that the reactance of the antenna when the antenna is positioned in free space (at or near the operational frequency of the antenna) is substantially the same as that when the antenna is positioned in proximity to a ground plane. In other exemplary embodiments, a length of the conductive tab is selected such that at the operational frequency the impedance mismatch factor between the feed (e.g., a transmitter or a receiver connected to the antenna) and the antenna has less than 6 dB difference between a free space environment and an environment in proximity to a ground plane. In still other embodiments, the length of the conductive tab is selected such that the impedance mismatch factor between the feed and the antenna has less than 4 dB difference between the two environments, or less than 3 dB difference between the two environments. In other embodiments, the length of the conductive tab is selected such that the difference between the impedance mismatch factor between the feed and the antenna from one environment to the other is arbitrarily small.

The detuning-tolerant loop antennas described herein are suitable for use in RFID tags, mobile telephones, and other devices that incorporate antennas and that are commonly operated in variable environments. For instance, the loop antennas described herein can be included in RFID tags that are suitably adhered to both metal surfaces as well as non-conducting surfaces that are not in proximity to conductors. Hence, a same RFID tag that incorporates a loop antenna described herein can be used in free space and in proximity to a ground plane with small efficiency loss between the two environments.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 4 is a side view of an exemplary RFID tag incorporating a loop antenna.

DETAILED DESCRIPTION

Figure 1:
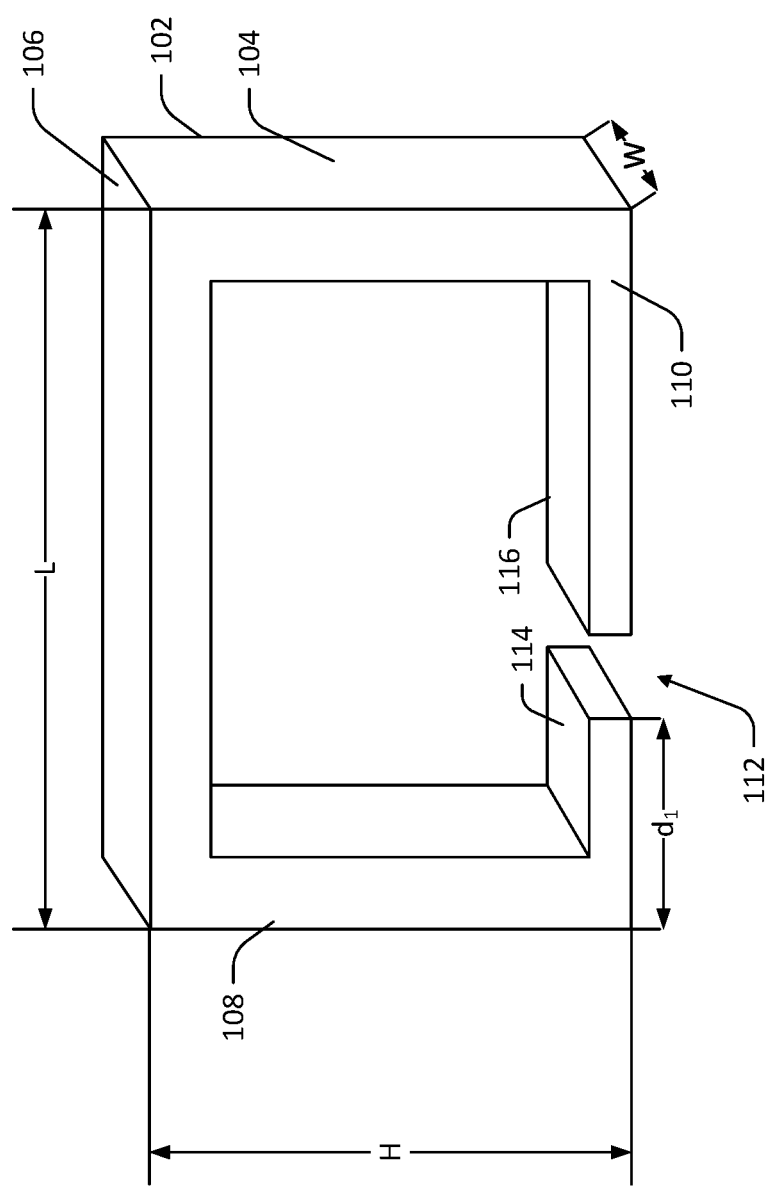
FIG. 1 is a perspective view of an exemplary detuning-tolerant rectangular loop antenna.

Various technologies pertaining to a detuning-tolerant loop antenna are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

With reference to FIG. 1, an exemplary detuning-tolerant loop antenna 100 is illustrated, wherein the antenna 100 is operable at an operational frequency in both a free space environment and in proximity to a ground plane, with a small change in impedance mismatch factor between the antenna 100 and a transmitter or a receiver connected to the antenna 100 (e.g., impedance mismatch factor change of less than or equal to 6 dB, less than or equal to 4 dB, or less than or equal to 3 dB) between the two environments. In an example, a free space environment and a ground plane environment can be defined relative to a size of a largest dimension of the antenna 100. The size of the largest dimension of the antenna 100 can be defined as a diameter of a smallest sphere that contains the antenna 100. In one example, a free space environment can be an environment wherein the antenna 100 is positioned farther than a threshold distance away from a nearest ground plane or other large conductive surface, where the threshold distance is the same as the length of the largest dimension of the antenna 100. In another example, a ground plane environment can be an environment wherein the antenna 100 is positioned less than a threshold distance away from the nearest ground plane or large conductive surface, where the threshold distance is the same as the length of the largest dimension of the antenna 100. In various examples, as used herein a ground plane can be a conductive plate, a container of conductive material such as salt water, organic tissue, or substantially any other conductive material.

The exemplary loop antenna 100 is a rectangular loop antenna that comprises a looped conductive element 102 having three continuous sides 104-108 and a fourth side 110 that has a gap 112 formed therein. The four sides 104-110 are arranged so as to form a rectangle. The fourth side 110 comprises a first tab 114 and a second tab 116 that both extend toward and define the gap 112 formed in the fourth side 110. In an exemplary embodiment, the tabs 114, 116 serve as a feed of the antenna 100. As described in greater detail below, the dimensions of the tabs 114, 116 can be selected such that the loop antenna 100 can transmit or receive signals in both a free space environment and in proximity to a ground plane with a detuning loss that is within a desired detuning loss threshold. In exemplary embodiments, lengths of the tabs 114, 116 are selected such that, for a constant incident power supplied to the antenna 100 by a feed, a ratio of the power accepted by the antenna 100 from the feed in a free space environment to the power accepted by the antenna 100 from the feed when the antenna 100 is in proximity to a ground plane is less than 6 dB, less than 4 dB, or less than 3 dB. Stated differently, a power ratio (PR) of the antenna 100 between the free space environment and the ground plane environment can be defined as $$PR = \frac{P_{FS}}{P_{GND}} \qquad (1)$$

where $P_{FS}$ is the power delivered from the feed to the antenna 100 when the antenna 100 is in the free space environment, and $P_{GND}$ is the power delivered from the feed to the antenna 100 when the antenna 100 is in proximity to a ground plane. Lengths of the tabs 114, 116 can be selected such that PR is less than 6 dB, less than 4 dB, or less than 3 dB.

In other exemplary embodiments, lengths of the tabs 114, 116 are selected such that a magnitude of a detuning loss of the antenna 100 between the free space environment and the ground plane environment is less than 6 dB, less than 4 dB, or less than 3 dB. The detuning loss of the antenna 100 can be defined as $$DL = \frac{1 - |\Gamma_{FS}|^2}{1 - |\Gamma_{GND}|^2} \quad (2)$$

where $\Gamma_{FS}$ and $\Gamma_{GND}$ are the voltage reflection coefficients at the interface between the feed and the antenna in the free space and ground plane environments, respectively. In exemplary embodiments, the lengths of the tabs 114, 116 are selected such that the magnitude of DL is less than 6 dB, less than 4 dB, or less than 3 dB, as described in greater detail below.

When an antenna is placed in proximity to a ground plane, the ground plane reflects radiated EM signals that impinge on the ground plane, and these reflections can be modeled as a mirror image of the antenna reflected over the ground plane. By way of example, and referring now to FIG. 2, a diagram 200 including a side view of the antenna 100 and a virtual mirror image 202 of the antenna 100 reflected over a ground plane 204 is shown. The virtual mirror image 202 of the antenna 100 includes mirror images 206, 208 of the tabs 114, 116, respectively. The antenna 100 is positioned at a distance x above the ground plane 204. Hence, the virtual mirror image 202 of the antenna 100 is modeled as being a distance x below the ground plane 204, such that the total distance between the antenna 100 and its virtual mirror image 202 is 2x.

Figure 3A:
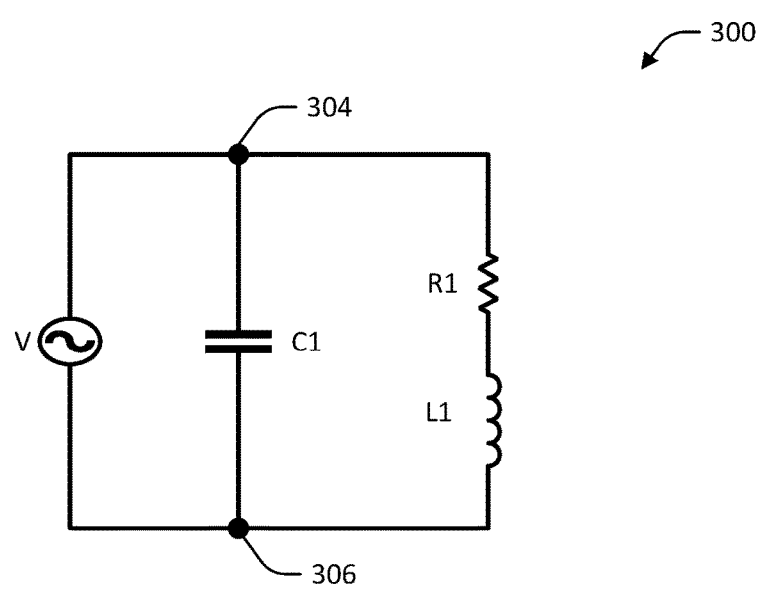
FIG. 3A is a circuit diagram illustrating a circuit model of the rectangular loop antenna of FIG. 1 when operated in free space.
Figure 3B:
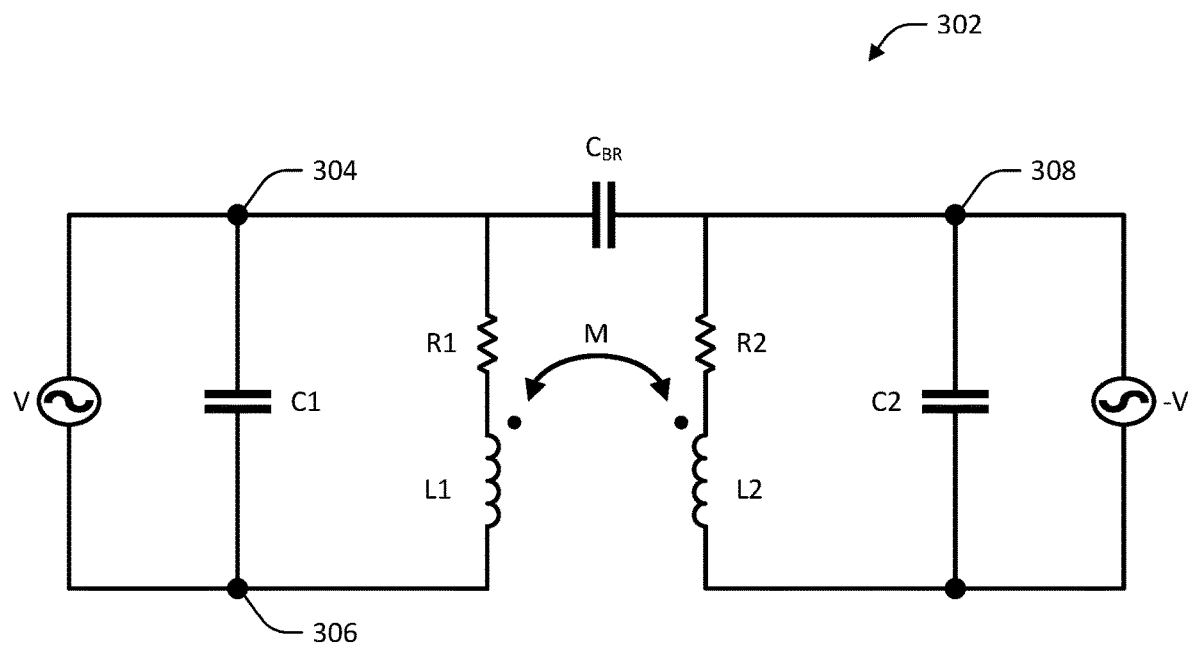
FIG. 3B is a circuit diagram illustrating a circuit model for the rectangular loop antenna of FIG. 1 when operated in proximity to a ground plane.

As indicated above, the virtual mirror image 202 of the antenna 100 can be used to model behavior of the antenna 100 when the antenna 100 is in proximity to the ground plane. Referring now to FIGS. 3A and 3B, equivalent circuit models 300 and 302 of the loop antenna 100 are shown for a free space environment and an environment where the antenna 100 is in proximity to a ground plane, respectively. It is to be understood that in reference to components of the circuit models 300, 302, same reference characters may be used to refer to a component and a value of an electrical characteristic of the component. For instance, a capacitor may be referred to by reference letter C and the capacitance of the capacitor may also be referred to by the same reference letter C.

Referring now solely to FIG. 3A, the circuit model 300 of the antenna 100 is an equivalent circuit model of the antenna 100 in a free space environment. The circuit model 300 of the antenna 100 includes a capacitor $C_1$ in parallel with a series combination of a resistor $R_1$ and an inductor $L_1$. The circuit model 300 further includes a voltage source V that represents a signal fed to the antenna 100 (e.g., at the tabs 114, 116) at feed nodes 304, 306. Values of the capacitance $C_1$, the resistance $R_1$, and the inductance $L_1$ depend on geometry of the antenna 100, and may be computed based upon such geometry. For instance, and referring again briefly to FIG. 1, values of the capacitance $C_1$, the resistance $R_1$, and the inductance $L_1$ can be computed based upon a length L of the rectangular loop antenna 100, a height H of the rectangular loop antenna 100, and a width W of the rectangular loop antenna 100. It is to be understood that values of the components in the circuit models 300, 302 for the antenna 100 can be further dependent on the shape and material composition of the conductive element 102 of the antenna 100 as well as that of any associated geometry such as a housing 402, power source 510, or ground plane 406. In other exemplary embodiments, values of the capacitance $C_1$, the resistance $R_1$, and the inductance $L_1$ can be determined based upon simulation or experimental results.

Referring now solely to FIG. 3B, the circuit model 302 is an equivalent circuit model of the antenna 100 when the antenna 100 is positioned in proximity to a ground plane. The circuit model 302 includes the voltage source V, the capacitor $C_1$, the resistor $R_1$, and the inductor $L_1$ connected as in the circuit model 300 of FIG. 3A. To account for the virtual mirror image of the antenna 100 when the antenna 100 is positioned in proximity to a ground plane, the circuit model 302 further comprises a mirror image of the circuit model 300. The circuit model 302 further comprises a resistor $R_2$ and an inductor $L_2$ in series with the resistor $R_2$, a capacitor $C_2$ that is in parallel with the series combination of the resistor $R_2$ and the inductor $L_2$, and a voltage source −V that is connected in parallel with the capacitor $C_2$. The values of the resistance $C_2$, the resistance $R_2$, and the inductance $L_2$ are the same as the values of the capacitance $C_1$, the resistance $R_1$, and the inductance $L_1$, respectively. The voltage output by the voltage source −V has the same magnitude as the voltage output by the voltage source V, but with a 180° phase shift. The circuit model 302 also includes a mutual inductance M between inductors $L_1$ and $L_2$ that is representative of mutual coupling between the antenna 100 and its virtual mirror image 202 over the ground plane 204. The value of the mutual inductance M depends upon physical parameters of the antenna 100 (e.g., material composition of the antenna 100, geometry of the antenna 100, etc.) and position and orientation of the antenna 100 relative to the ground plane 204.

The circuit model 302 further includes a bridging capacitor $C_{BR}$ that is connected between the resistor $R_1$ and the resistor $R_2$, such that the capacitor $C_{BR}$ connects a portion of the circuit model 302 that is representative of the antenna 100 (voltage source V, capacitor $C_1$, resistor $R_1$, and inductor $L_1$) and a portion of the circuit model 302 that is representative of its virtual image 202. The bridging capacitor $C_{BR}$ approximately represents the capacitance between the tabs 114, 116 and their respective mirror images 206, 208 over the ground plane 204. The bridging capacitance $C_{BR}$ is a series combination of two separate capacitances: $C_{BR1}$ that is representative of the capacitance between the tab 114 and its mirror image 206 and $C_{BR2}$ that is representative of the capacitance between the tab 116 and its mirror image 208. For simplicity of explanation $C_{BR}$ is presented in the circuit model 302 as a single capacitor, but could alternatively be represented as capacitors $C_{BR1}$ and $C_{BR2}$ connected in series between the primary feed node 304 and a mirror image 308 of the primary feed node 304.

In exemplary embodiments, the lengths of the tabs 114, 116 are selected to ensure that the detuning loss from the free space environment to the ground plane environment, or from the ground plane environment to the free space environment, is within a desired detuning loss threshold. The detuning loss can be maintained within the desired loss threshold by matching a reactive part of the impedance of the antenna in free space to a reactive part of the impedance of the antenna when the antenna is in proximity to a ground plane. By way of example, the detuning loss can be maintained within the detuning loss threshold by matching the reactance looking into the feed terminals 304, 306 in the circuit model 300 (when the antenna 100 is in free space) to the reactance looking into the feed terminals 304, 306 in the circuit model 302 (when the antenna 100 is in proximity to a ground plane). In exemplary embodiments, the lengths of the tabs 114, 116 are selected such that the reactance looking into the feed terminals 304, 306 in the circuit model 300 is within 10%, within 5%, or within 1% of the reactance looking into the feed terminals 304, 306 in the circuit model 302.

Using circuit analysis techniques, it can be determined from the foregoing that the reactance looking into the terminals 304, 306 in the circuit model 300 is equal to the reactance looking into the terminals 304, 306 in the circuit model 302 when the following is approximately satisfied:

$$C_{BR} \sim \frac{1}{2}\left(\frac{k}{1-k}\right)\left(\frac{1}{\omega_c^2 L_1}\right) \quad (3)$$

where $\omega_c$ is the operational frequency of the antenna 100, and where k is the coupling coefficient between the inductors $L_1$ and $L_2$, such that $$k = M/L_1 \quad (4)$$

Figure 2:
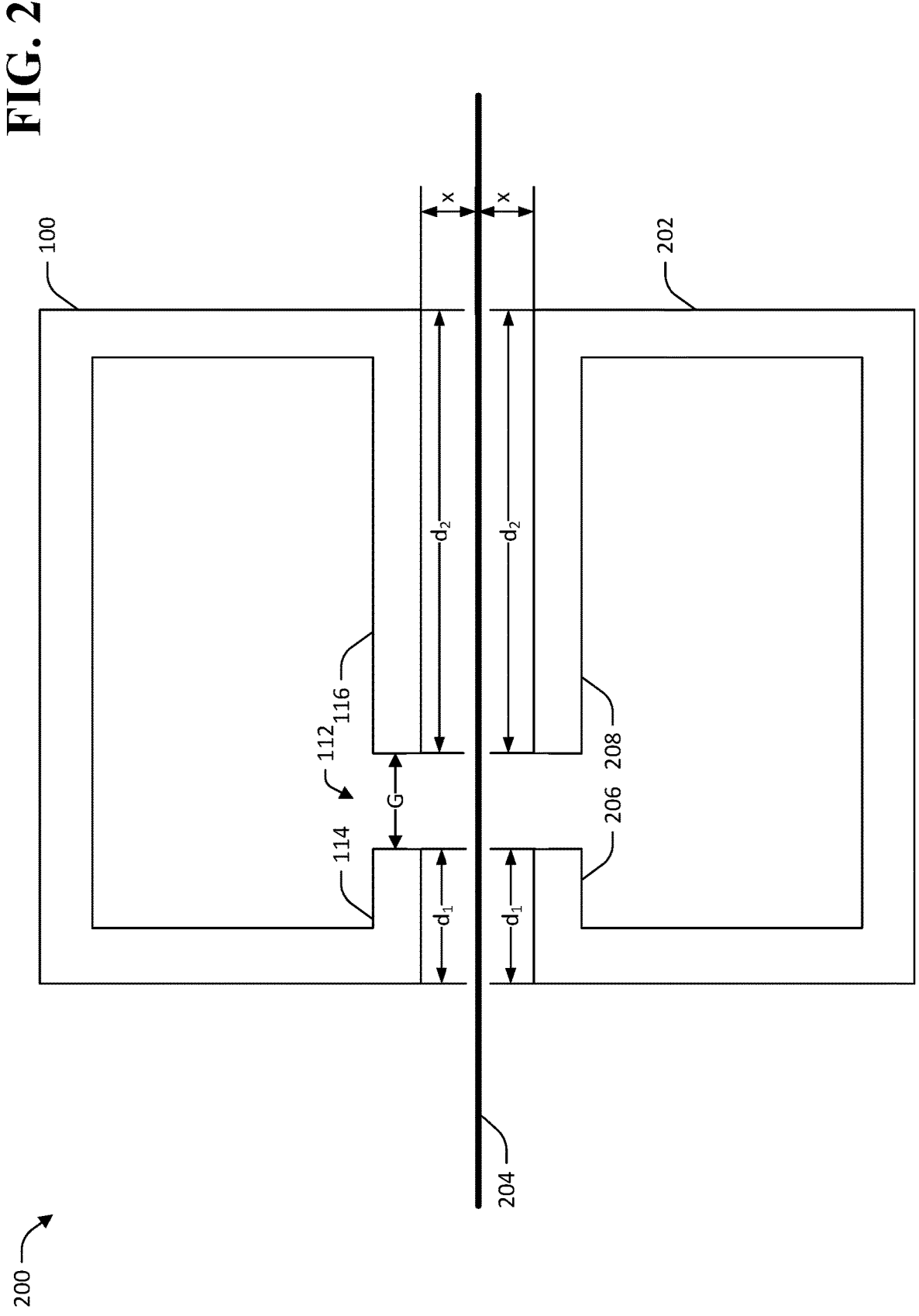
FIG. 2 is a side view of the exemplary rectangular loop antenna of FIG. 1.

As noted above, $C_{BR}$ is a series combination of the capacitance $C_{BR1}$ between the tab 114 and its mirror image 206 and the capacitance $C_{BR2}$ between the tab 116 and its mirror image 208. The capacitances $C_{BR1}$ and $C_{BR2}$ can be determined by modeling capacitance $C_{BR1}$ as a parallel plate capacitor with tab 114 and its mirror image 206 as parallel plates, and by modeling capacitance $C_{BR2}$ as a parallel plate capacitor with tab 116 and its mirror image 208 as parallel plates. Thus, the capacitance $C_{BR1}$ is given by:

$$C_{BR1} \sim \varepsilon_0 \varepsilon_r d_1 w / 2x \quad (5)$$

while capacitance $C_{BR2}$ is given by:

$$C_{BR2} \sim \varepsilon_0 \varepsilon_r d_2 w / 2x \quad (6)$$

where $\varepsilon_0$ is the permittivity of free space, $\varepsilon_r$ is the relative effective permittivity of the space between the antenna 100 and its image 202 over the ground plane 204, $d_1$ and $d_2$ are the lengths of the tabs 114, 116, respectively (e.g., as shown in FIG. 2), w is the width of the tabs (e.g., as shown in FIG. 1), and 2x is the distance between the antenna 100 and its mirror image 202 (e.g., twice the distance between the antenna 100 and the ground plane 204, as shown in FIG. 2).

To reduce detuning loss when compared to a conventional loop antenna, the loop antenna 100 is constructed such that the series combination of capacitances $C_{BR1}$ and $C_{BR2}$ as given by Equations 5 and 6, respectively, is substantially equal to $C_{BR}$ (e.g., within 25% of $C_{BR}$, within 15% of $C_{BR}$, or within 10% of $C_{BR}$) as given by Equation 3. When the value of $C_{BR}$ shown in FIG. 3B is sufficiently close to the value that satisfies Equation 3, the power ratio as defined by Equation 1 and the detuning loss as defined by Equation 2 can be maintained below a threshold level of loss (e.g., less than 6 dB, less than 4 dB, or less than 3 dB).

It will be understood by those of skill in the art that values of $L_1$, M, and k depend on a size and shape of the antenna 100, and that therefore dimensions of the antenna 100 such as length L, height H, width w as shown in FIG. 1, and $d_1$, $d_2$, and G as shown in FIG. 2 will generally be selected according to several antenna design considerations, among which is tuning the series combination of capacitances $C_{BR1}$ and $C_{BR2}$ as given by Equations 5 and 6 to be substantially equal to $C_{BR}$ given by Equation 6. In an example, the length L, height H, width w, and gap width G of the antenna 100 can be selected based upon desired values of antenna operating parameters such as operational frequency $\omega_c$, impedance, antenna capacitance $C_1$, antenna inductance $L_1$, etc. The values L, H, w, and G can then be taken as fixed parameters, and the lengths $d_1$, $d_2$ of the tabs 114, 116, respectively, are selected to satisfy Equation 3, such that the detuning loss is within a desired detuning loss threshold.

In some cases, it may be desirable to reduce a number of design variables for a loop antenna described herein. Since $C_{BR}$ is a series combination of $C_{BR1}$ and $C_{BR2}$, when one of the capacitances $C_{BR1}$, $C_{BR2}$ is small relative to the other (e.g., less than or equal to one half as much capacitance, less than or equal to one third as much capacitance, or less than or equal to one fourth as much capacitance), $C_{BR}$ is primarily determined by the smaller of the values. Therefore, a value of $C_{BR}$ can be controlled by holding a length G (shown in FIG. 2) of the gap 112 constant and varying the length $d_1$ of the tab 114, treating $C_{BR}$ as substantially equal to $C_{BR1}$ as given by Equation 5 above.

It is further to be understood that the exemplary antenna 100 may be used with a matching circuit to match the antenna impedance to the impedance of a transmission line or other source used to feed the antenna 100. The same matching circuit can be used with the antenna 100 in both the free space and ground plane environments. By way of example, a common matching circuit comprises lumped element capacitors that are configured in series and/or in shunt with the antenna terminals.

Referring now to FIG. 4, an exemplary RFID tag 400 is illustrated, wherein the RFID tag 400 comprises the square loop antenna 100. The RFID tag 400 comprises a housing 402 that contains the loop antenna 100, and further includes an RFID tag circuit 404 (e.g., an integrated circuit) that is connected between the tabs 114, 116 in the gap 112. The RFID tag circuit 404 is configured to receive electrical signals output by the antenna 100 (e.g., at the tabs 114, 116 responsive to receiving a radiating electromagnetic, or EM, signal that impinges on the antenna 100) and perform various operations based upon such received signals. By way of example, responsive to receiving a radiated EM signal from an RFID tag reader at the antenna 100, the antenna 100 outputs an electrical signal to the RFID tag circuit 404, where the electrical signal is indicative of data encoded on the radiated EM signal by the RFID tag reader. The RFID tag circuit 404 can be configured to output an electrical signal to the antenna 100 that causes the antenna 100 to output a radiated EM signal to the RFID tag reader. The radiated EM signal output by the antenna 100 is indicative of data encoded on the electrical signal output to the antenna 100 by the RFID tag circuit 404. The data can include information pertaining to an object to which the RFID tag 400 is desirably attached. In other exemplary embodiments, the RFID tag 400 can be configured as an active or passive RFID tag.

The RFID tag 400 is shown as being attached to a ground plane 406. The housing 402 of the RFID tag 400 comprises a first side 408 and a second side 410 opposite the first side 408. In exemplary embodiments, the RFID tag 400 is configured such that the first side 408 can be attached to an object, such as the ground plane 406. For instance, an adhesive layer (not shown) can be applied to the first side 408 of the housing 402 of the RFID tag 400 such that the first side 408 can be adhered to an object. In another example, the RFID tag 400 can be affixed to an object using fasteners. Other suitable means of attaching the RFID tag 400 to objects are also contemplated as being within the scope of the present disclosure.

In the exemplary RFID tag 400 shown, the antenna 100 is disposed in the housing 402 such that the tabs 114, 116 of the antenna 100 are substantially parallel to the ground plane 406 when the first side 408 of the housing 402 is attached to the ground plane 406. The antenna 100 is positioned within the housing 402 such that the tabs 114, 116 are nearer the first side 408 than the second side 410, and are substantially parallel to the first side 408. As indicated above, the capacitance $C_{BR1}$ is dependent on the relative effective permittivity, $\varepsilon_r$, of the space between the antenna 100 and its image 202. Hence, in the RFID tag 400, the relative effective permittivity, $\varepsilon_r$, is dependent on the material composition of the housing 402. Accordingly, the material composition of the housing 402 may be selected in part based upon a desired value of $C_{BR1}$. It is to be understood that while the tabs 114, 116 of the antenna 100 are substantially parallel to the ground plane 406 when used in the RFID tag 400 as shown in FIG. 4, in other exemplary embodiments the tabs 114, 116 of the antenna 100 need not be parallel to the ground plane.

Figure 5:
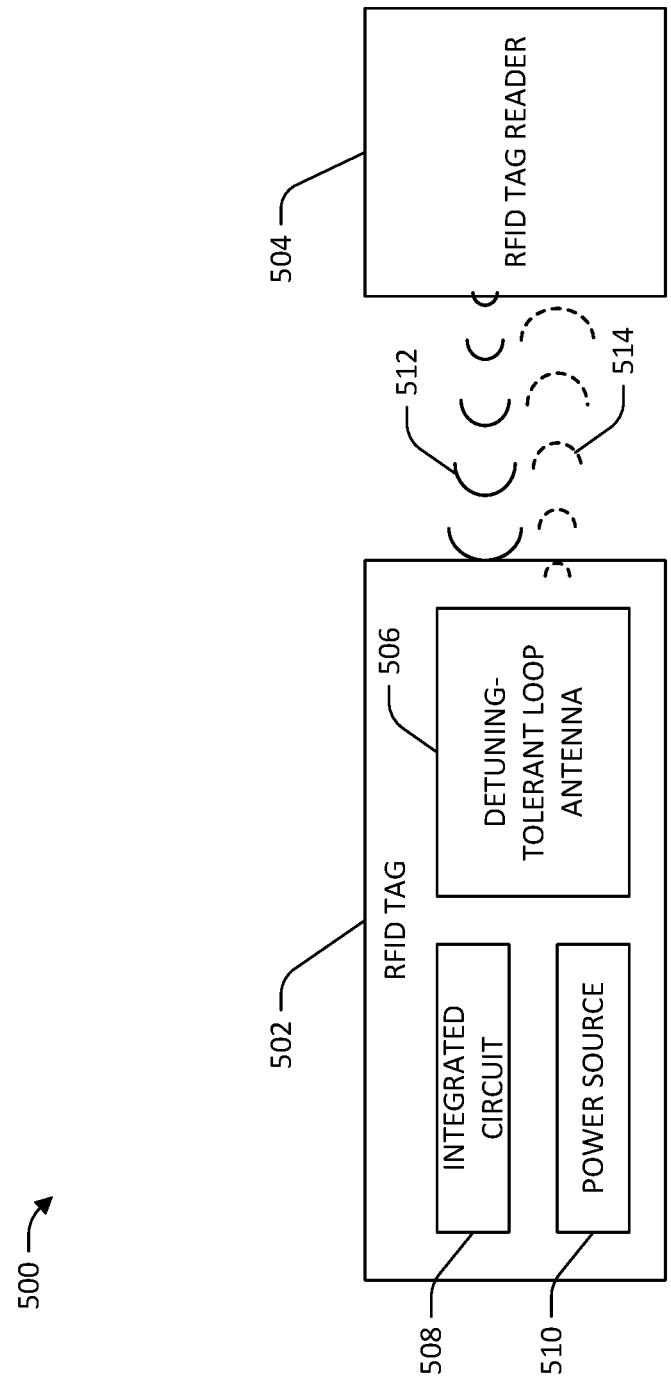
FIG. 5 is a functional block diagram of an exemplary RFID system incorporating a detuning-tolerant loop antenna.

The RFID tag 400 can be included in an RFID tag reading system. Referring now to FIG. 5, an exemplary system 500 that comprises an RFID tag 502 and an RFID tag reader 504 is illustrated. The RFID tag 502 comprises a detuning-tolerant loop antenna 506 (e.g., the loop antenna 100), an integrated circuit 508, and optionally includes a power source 510 that provides power to the integrated circuit 508. The system 500 can be operated in various configurations.

In a first configuration, the RFID tag reader 504 outputs a radiated read signal 512 that is received by the detuning-tolerant loop antenna 506. The radiated read signal 512 impinges on the detuning-tolerant loop antenna 506, and the detuning-tolerant loop antenna 506 outputs an electrical signal to the integrated circuit 508 based on the impinging signal. The integrated circuit 508 decodes data encoded on the electrical signal (e.g., as encoded by the RFID tag reader 504 on the radiated signal 512), and outputs an electrical signal by way of a conductor to the detuning-tolerant loop antenna 506, the electrical signal based on the decoded data. The detuning-tolerant loop antenna 506 outputs a radiated RFID tag signal 514 responsive to receiving the electrical signal from the integrated circuit 508. The RFID tag reader 504 receives the radiated RFID tag signal 514 and identifies some data pertaining to an object to which the RFID tag 502 is attached based upon the signal 514.

In a second configuration, the RFID tag 502 periodically transmits the radiated RFID tag signal 514 without waiting for an interrogation signal from the RFID tag reader 504. In the second configuration, the RFID tag reader 504 identifies data pertaining to an object to which the RFID tag 502 is attached responsive to receiving the radiated RFID tag signal 514.

The components 506-510 of the RFID tag can be contained within a housing that is configured to be attached to an object (e.g., as described above with respect to the RFID tag 400). The RFID tag 502 can be attached to an object and configured so that when the RFID tag reader 504 receives a signal from the RFID tag 502, the RFID tag reader 504 can output data indicative of some attribute of the object. For example, the integrated circuit 508 of the RFID tag 502 can be configured to output a signal by way of the detuning-tolerant loop antenna 506 wherein the signal is indicative of an attribute of an object to which the RFID tag 502 is attached (e.g., contents of a container to which the RFID tag 502 is attached, a manufacturer of the object, a number of times the RFID tag 502 has been read by an RFID tag reader, etc.). Since the detuning-tolerant loop antenna 506 exhibits low detuning loss between free space and ground plane environments, the RFID tag 502 is suitable for use on both metal objects and non-metal objects. By contrast, a conventional RFID tag that is tuned for use on metal objects, when attached to a non-metal object, can exhibit detuning loss that weakens a signal output by the conventional RFID tag to the point where an RFID tag reader is unable to decode information encoded on the signal by the conventional RFID tag.

Figure 6A:
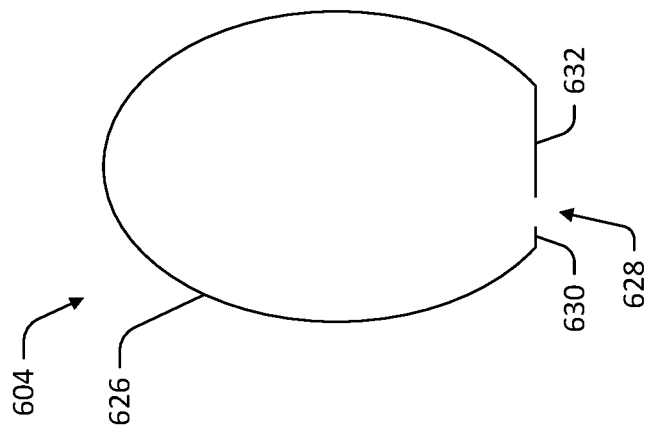
FIG. 6A is a diagram of an exemplary triangle loop antenna.

While various aspects have been described herein relative to the square loop antenna 100 depicted in FIGS. 1 and 2, it is to be understood that such aspects are similarly applicable to loop antennas of other geometries. By way of example, and referring now to FIGS. 6A-6C, alternative loop antennas 600-604 having non-square geometries are shown. Referring now solely to FIG. 6A, the loop antenna 600 comprises a triangular looped conductive element 606. The triangular looped conductive element 606 comprises a first continuous side 608, a second continuous side 610, and a third side 612 having a gap 614 formed therein. The third side 612 comprises a first tab 614 and a second tab 616 that extend inward from the first side 608 and second side 610 of the triangular looped element 606, respectively.

Figure 6B:
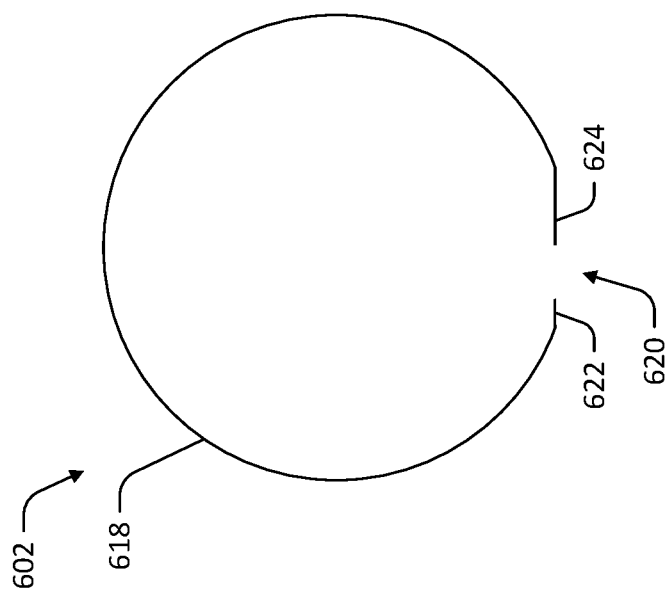
FIG. 6B is a diagram of an exemplary circular loop antenna.

Referring now solely to FIG. 6B, the loop antenna 602 comprises a circular looped conductive element 618 having a gap 620 formed therein at a chord of a circle formed by the circular looped conductive element 618. The looped conductive element 618 comprises a first tab 622 and a second tab 624 that extend inward toward the gap 620 along the chord.

Figure 6C:
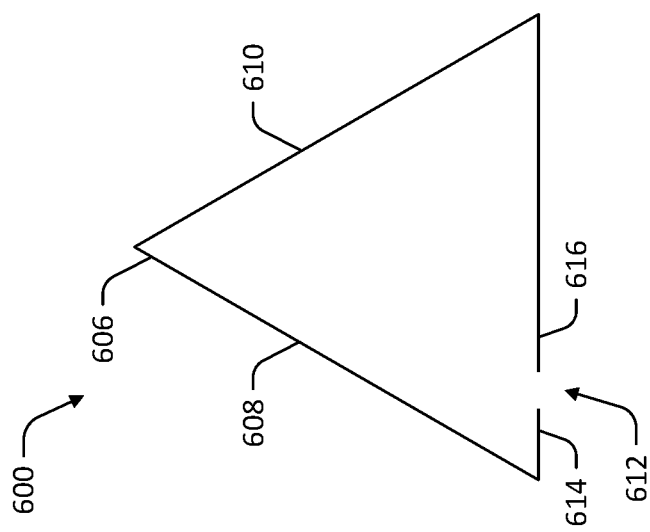
FIG. 6C is a diagram of an exemplary elliptical loop antenna.

Referring now solely to FIG. 6C, the loop antenna 604 comprises an elliptical looped conductive element 626 that forms a substantially elliptical shape. The elliptical conductive element 626 has a gap 628 formed therein along a chord of the ellipse formed by the elliptical conductive element 626. The elliptical conductive element 626 comprises a first tab 630 and a second tab 632 that extend inward toward the gap 628.

Lengths of the tabs 614, 616, 622, 624, 630, and 632 are selected such that the detuning loss of the antenna 600 is within a desired threshold detuning loss, as described above with respect to the rectangular loop antenna 100.

Figure 7A:
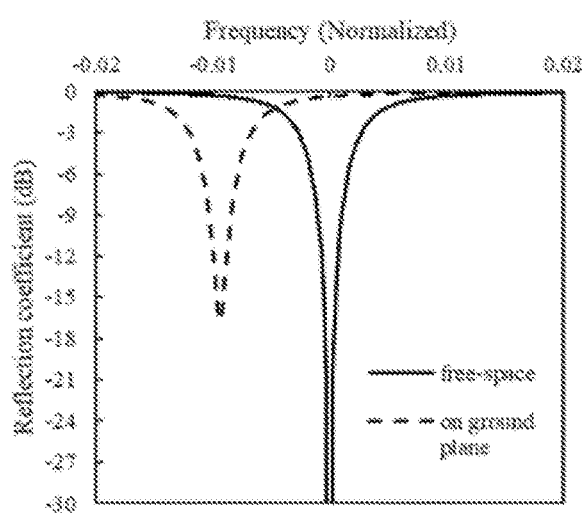
FIG. 7A is a diagram illustrating certain simulation results pertaining to a conventional antenna.
Figure 7B:
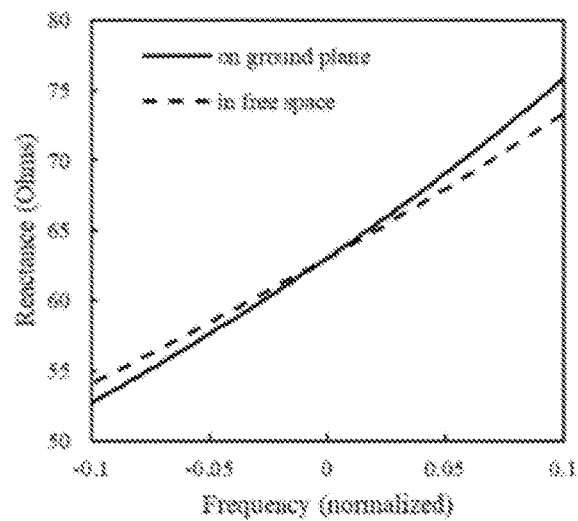
FIG. 7B is a diagram of simulation results indicating reactance of a detuning-tolerant loop antenna versus normalized frequency.
Figure 7C:
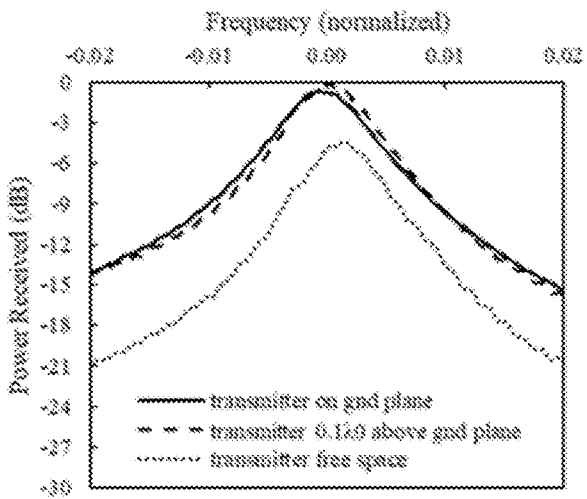
FIG. 7C is a diagram of certain experimental results indicating power received by a detuning-tolerant loop antenna from an antenna feed versus normalized frequency.

Certain experimental and simulation results pertaining to performance characteristics of conventional antennas and the detuning-tolerant loop antennas are presented in FIGS. 7A-7C. Referring now solely to FIG. 7A, a diagram 700 is shown that depicts a voltage reflection coefficient versus frequency for a conventional antenna that is not constructed to be detuning tolerant according to the devices and methods described herein. The "conventional" antenna used to generate the results shown in FIG. 7A was constructed by starting with a detuning-tolerant loop antenna (e.g., as described herein above) and shortening one of the tabs such that the antenna was no longer detuning-tolerant. In FIG. 7A, the frequency is normalized to the desired operational frequency according to:

$$\omega_n = \frac{\omega - \omega_c}{\omega_c} \qquad (7)$$

where $\omega$ is the non-normalized frequency, $\omega_c$ is the desired operational frequency, and $\omega_n$ is the resulting normalized frequency. As noted above, the diagram 700 illustrates that the conventional antenna is tuned to have a minimum reflection coefficient (and thus maximum power transferred from the antenna feed to the antenna) when operated in free space at the operational frequency $\omega_c$. However, when the conventional antenna is operated on or near a ground plane, the conventional antenna has minimum reflection coefficient at a frequency that is 1% less than the operational frequency $\omega_c$, and exhibits a detuning loss of approximately 11 dB relative to when the conventional antenna is in free space. It is to be understood that other conventional antenna geometries, including conventional loop antenna geometries, can have detuning loss that is much greater than the 11 dB shown in FIG. 7A.

Referring now solely to FIG. 7B, a diagram 702 is shown that depicts a reactance of a detuning-tolerant loop antenna (e.g., the antennas 100, 600, 602, or 604) versus frequency normalized according to Equation 7. The diagram 702 depicts the reactance of the detuning-tolerant loop antenna when the antenna is not matched to a source (e.g., a transmitter, a receiver, a transmission line, etc.) The diagram 702 of FIG. 7B indicates that, at the operational frequency of the detuning-tolerant loop antenna, the reactance of the antenna is substantially the same whether the antenna is operated in free space or in proximity to a ground plane.

Referring now to FIG. 7C, a diagram 704 is shown that depicts certain experimental results indicating a power received from a transmitting detuning-tolerant loop antenna versus normalized frequency. The radiated signal transmitted by the loop antenna was monitored with a polarization-matched, sub-resonant monopole probe connected to a spectrum analyzer located about $\lambda_o$ away from the loop antenna, where $\lambda_o$ is the wavelength of the radiated signal at the operational frequency of the loop antenna. Measurements were taken with the antenna in three ground plane configurations: 1) on the ground plane, 2) $0.1\lambda_o$ away from the ground plane, and 3) with no ground plane. When the antenna is $0.1\lambda_o$ away from the ground plane, its input impedance is very close to that in a true free-space environment however its radiation pattern remains similar to that on a ground plane.) Little difference in the amplitude and frequency of the peak signal received was observed between configurations 1 and 2, as shown in the diagram 704. When the ground plane is removed entirely, the radiation pattern changes significantly resulting in 3 dB reduction due to this effect relative to when the ground plane is present. This effect is distinct from the power ratio and detuning loss effects described in Equations 1 and 2. A signal decrease of about 4 dB was observed with very little frequency shift in the signal peak, and therefore the detuning loss of this geometry is estimated to be about 1 dB.

Figure 8:
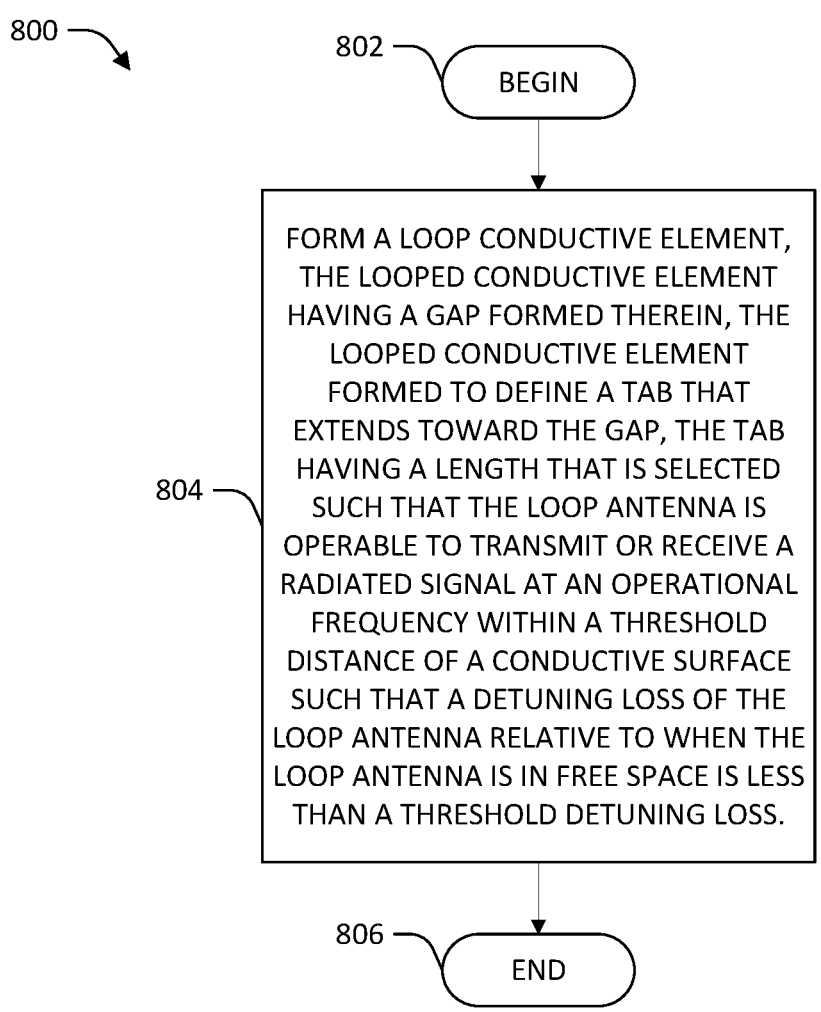
FIG. 8 is a flow diagram that illustrates an exemplary methodology for manufacturing a detuning-tolerant loop antenna.

FIG. 8 illustrates an exemplary methodology relating to making a loop antenna that is suitable for use in a free space environment and in proximity to a ground plane. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

The methodology 800 begins at 802, and at 804 a looped conductive element is formed such that the looped conductive element has a gap formed therein, with a tab extending inward toward the gap. A length of the tab is selected (e.g., such that Equation 3 is satisfied) such that the loop antenna can transmit or receive radiated signals at a desired operational frequency within a threshold level of detuning loss between a free space environment and an environment wherein the antenna is in proximity to a ground plane. Stated differently, the length of the tab is selected such that, when the antenna is within a threshold distance of a conductive surface (e.g., within a distance of the conductive surface that is less than two times the largest dimension of the antenna, within a distance that is less than the largest dimension of the antenna, or within a distance that is less than one half the largest dimension of the antenna), the detuning loss of the antenna relative to when the antenna is in free space is within a threshold level of detuning loss (e.g., less than 6 dB detuning loss, less than 4 dB of detuning loss, or less than 3 dB detuning loss). The methodology 800 completes at 806.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radio frequency identification (RFID) tag, comprising:
a loop antenna tuned for an operational frequency, the loop antenna comprising:
a looped conductive element having a gap formed therein, the looped conductive element formed so as to define a tab that extends toward the gap, the tab having a length, the length of the tab selected such that the loop antenna is operable to transmit or receive a radiated signal at the operational frequency both in a free space environment and within a threshold distance of a conductive surface, the loop antenna having a first reactance when the loop antenna is in free space, the loop antenna having a second reactance when the loop antenna is within the threshold distance of the conductive surface, the first reactance within 10% of the second reactance.

2. The RFID tag of claim 1, further comprising a housing, wherein the loop antenna is disposed within the housing such that when the housing is affixed to a surface the tab of the looped conductive element is substantially parallel with the surface.

3. The RFID tag of claim 2, the housing comprising a first side and a second side opposite the first side, the loop antenna disposed within the housing such that the tab of the looped conductive element is nearer the first side than the second side, the housing configured such that when the housing is affixed to an object the first side makes contact with the object.

4. The RFID tag of claim 1, wherein the threshold distance is twice a length of a largest dimension of the loop antenna.

5. The RFID tag of claim 1, wherein the threshold distance is equal to a length of a largest dimension of the loop antenna.

6. The RFID tag of claim 1, wherein a detuning loss of the loop antenna between the free space environment and within the threshold distance of the conductive surface is less than 6 dB.

7. The RFID tag of claim 1, wherein a detuning loss of the loop antenna between the free space environment and within the threshold distance of the conductive surface is less than 4 dB.

8. The RFID tag of claim 1, wherein a detuning loss of the loop antenna between the free space environment and within the threshold distance of the conductive surface is less than 3 dB.

9. The RFID tag of claim 1, wherein the looped conductive element has a rectangular shape, wherein the tab forms a portion of one side of the rectangular shape.

10. The RFID tag of claim 1, wherein a feed of the loop antenna comprises the tab.

11. A method for manufacturing a detuning-tolerant loop antenna, the method comprising:
forming a looped conductive element having a gap formed therein, the looped conductive element formed so as to define a tab that extends toward the gap, the tab having a length, the length of the tab selected such that the loop antenna is operable to transmit or receive a radiated signal at an operational frequency within a threshold distance of a conductive surface, the loop antenna having a first reactance when the loop antenna is in free space, the loop antenna having a second reactance when the loop antenna is within the threshold distance of the conductive surface, the first reactance within 10% of the second reactance.

12. The method of claim 11, wherein a detuning loss of the loop antenna between the free space environment and within the threshold distance of the conductive surface is less than 6 dB.

13. The method of claim 11, wherein the looped conductive element is formed to have a substantially circular shape.

14. The method of claim 11, wherein the looped conductive element is formed to have a triangular shape.

15. The method of claim 11, wherein the looped conductive element is formed to have a rectangular shape.

16. A loop antenna comprising:
a looped conductive element having a gap formed therein, the looped conductive element formed so as to define a tab that extends toward the gap, the tab having a length, the length of the tab selected such that when the loop antenna is within a threshold distance of a conductive surface the loop antenna is operable to transmit or receive a radiated signal at the operational frequency such that a detuning loss of the loop antenna relative to when the loop antenna is in free space is less than a threshold detuning loss, the loop antenna having a first reactance when the loop antenna is in free space, the loop antenna having a second reactance when the loop antenna is within the threshold distance of the conductive surface, the first reactance within 10% of the second reactance.

17. The loop antenna of claim 16, wherein the threshold detuning loss is 6 dB.

18. The loop antenna of claim 16, wherein the first reactance is within 5% of the second reactance.

19. The loop antenna of claim 16, wherein the first reactance is within 1% of the second reactance.

* * * * *